July 26, 1949.  H. W. BELL  2,477,230
INTERNAL-COMBUSTION ENGINE
Filed July 25, 1946   9 Sheets-Sheet 1

INVENTOR.
Harvey W. Bell
BY Moses, Nolte, Crews & Berry
ATTORNEYS

July 26, 1949. H. W. BELL 2,477,230
INTERNAL-COMBUSTION ENGINE
Filed July 25, 1946 9 Sheets-Sheet 2
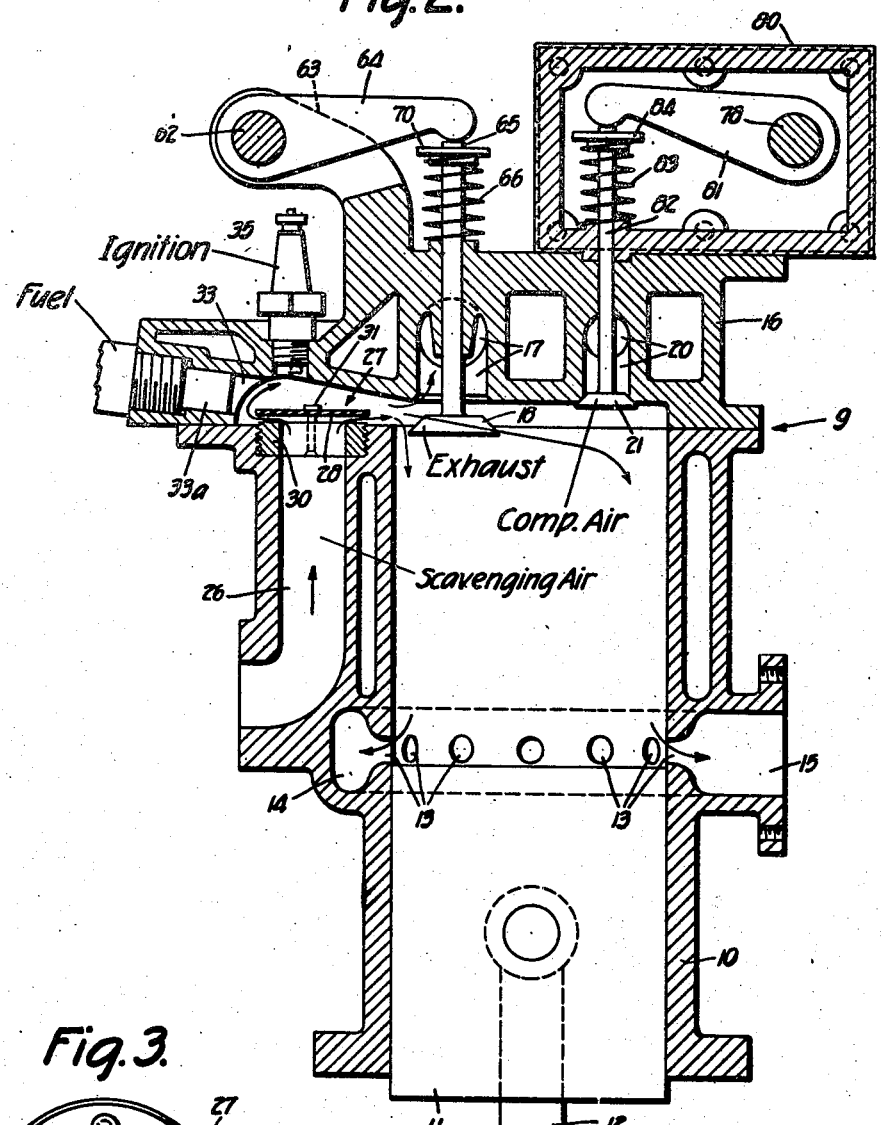
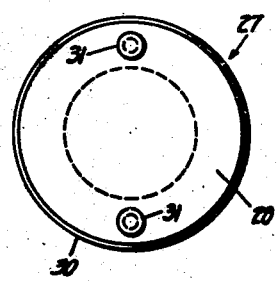
INVENTOR.
Harvey W. Bell
BY *Moses, Nolte, Crews & Berry*
ATTORNEYS

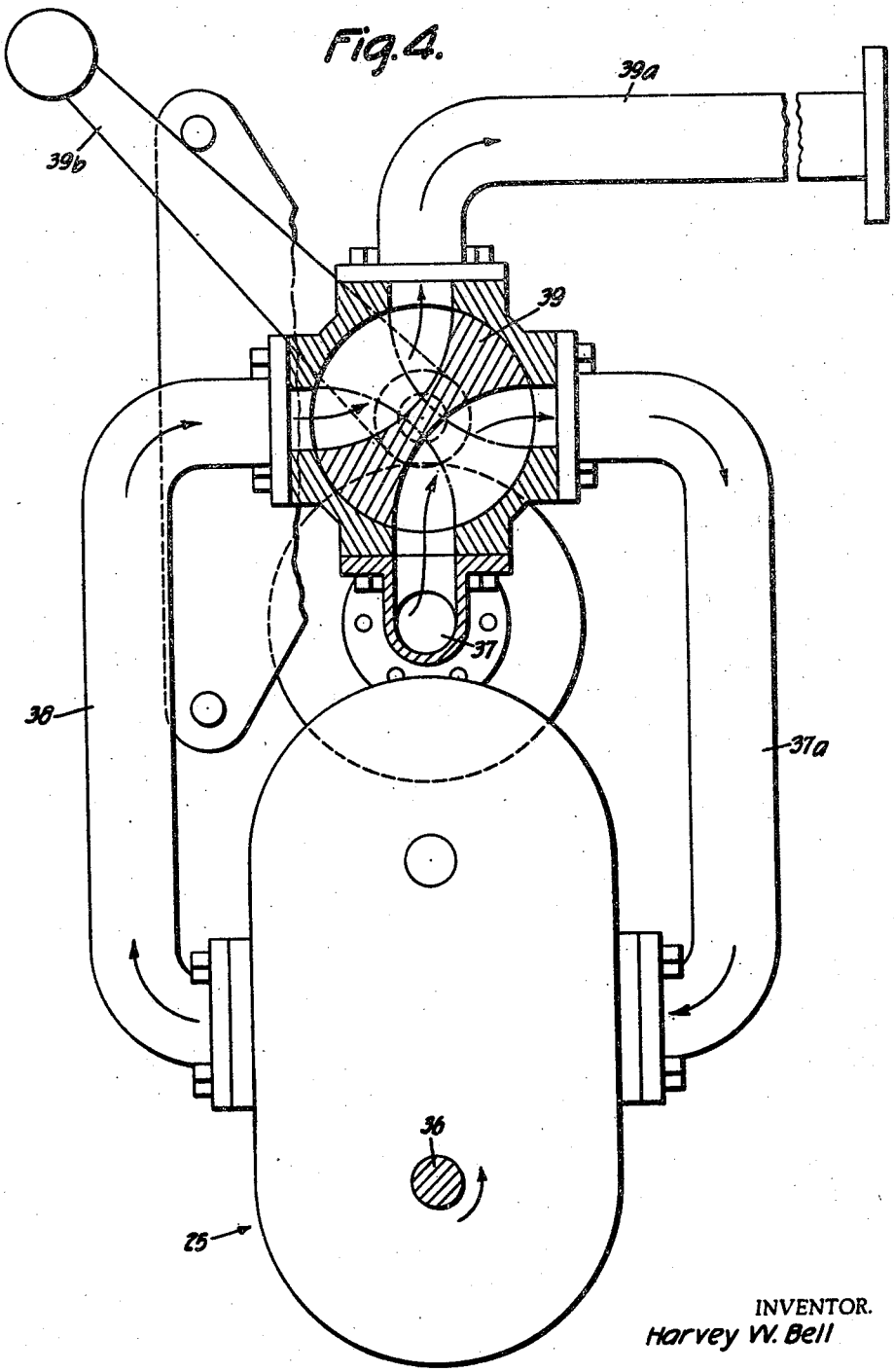

July 26, 1949.  H. W. BELL  2,477,230
INTERNAL-COMBUSTION ENGINE
Filed July 25, 1946  9 Sheets-Sheet 4
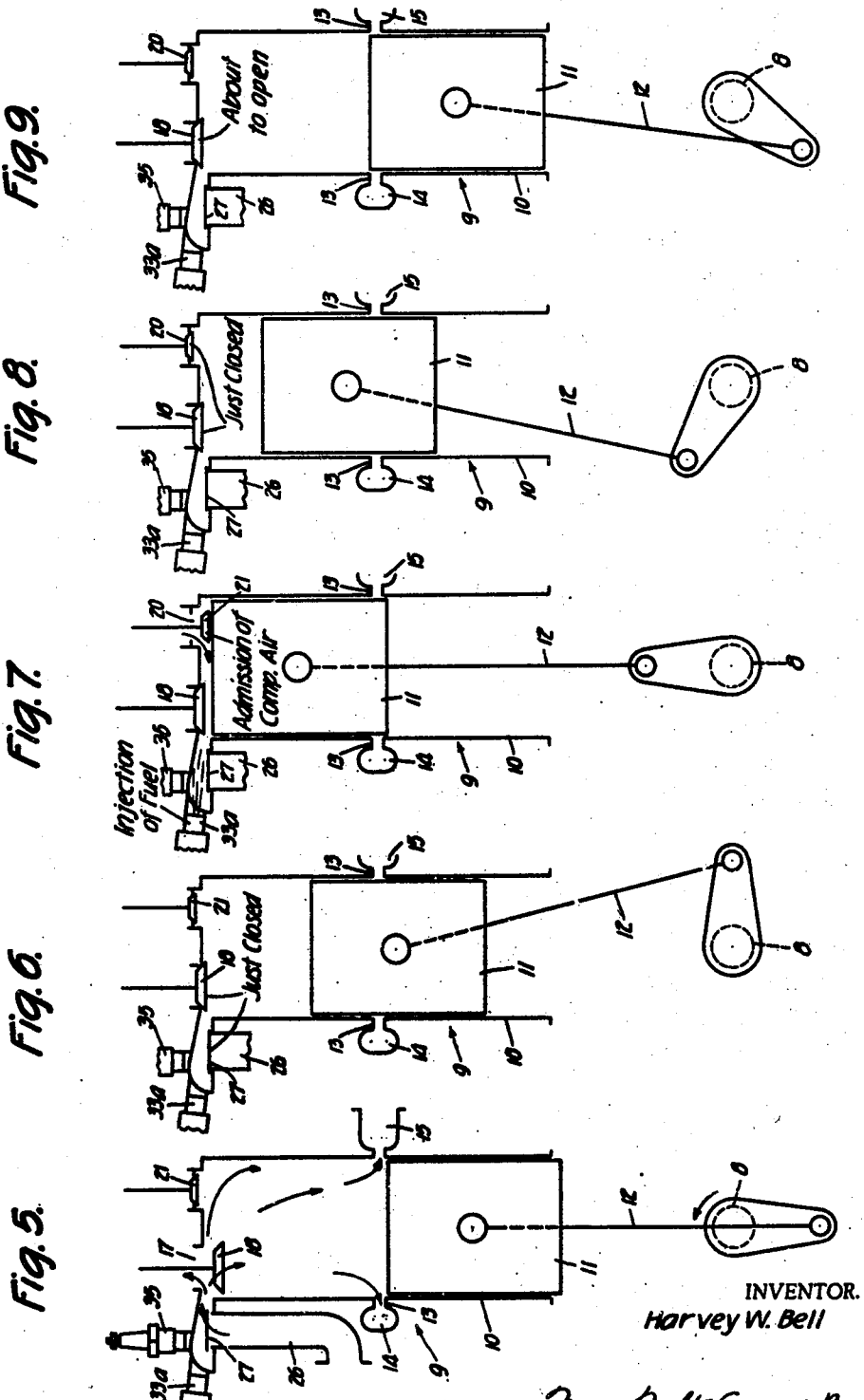
INVENTOR.
Harvey W. Bell
BY Moses, Nolte, Crews & Berry
ATTORNEYS July 26, 1949.  H. W. BELL  2,477,230
INTERNAL-COMBUSTION ENGINE
Filed July 25, 1946  9 Sheets-Sheet 5
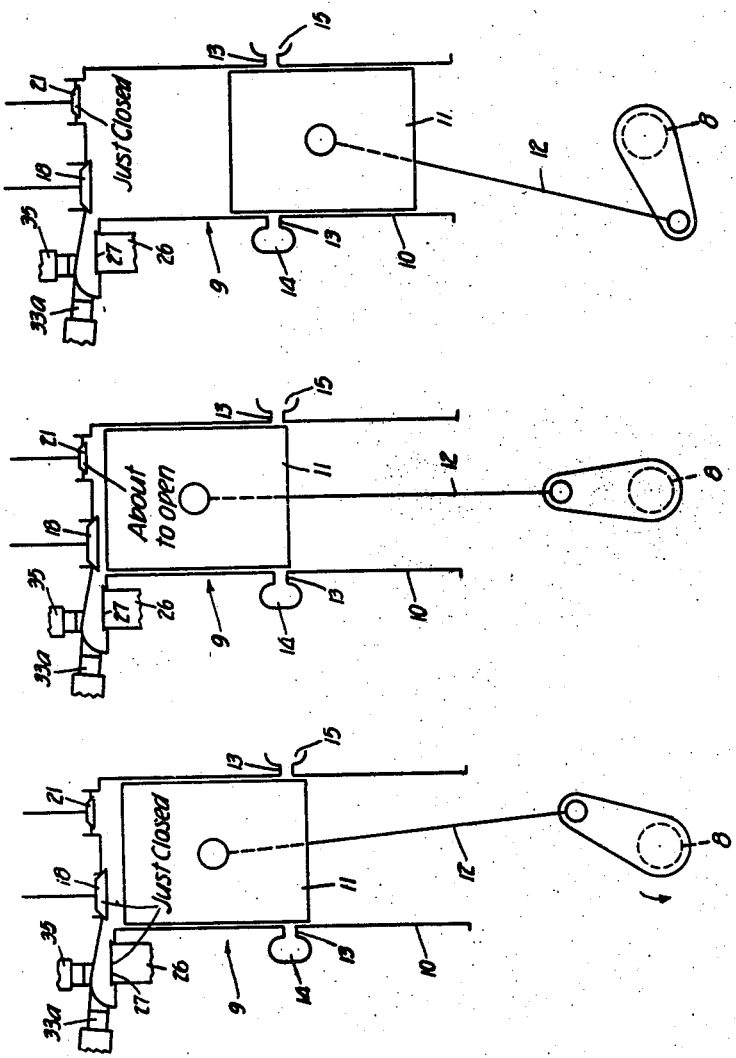
INVENTOR.
Harvey W. Bell
BY Moser, Nolte, Crewot Berry
ATTORNEYS

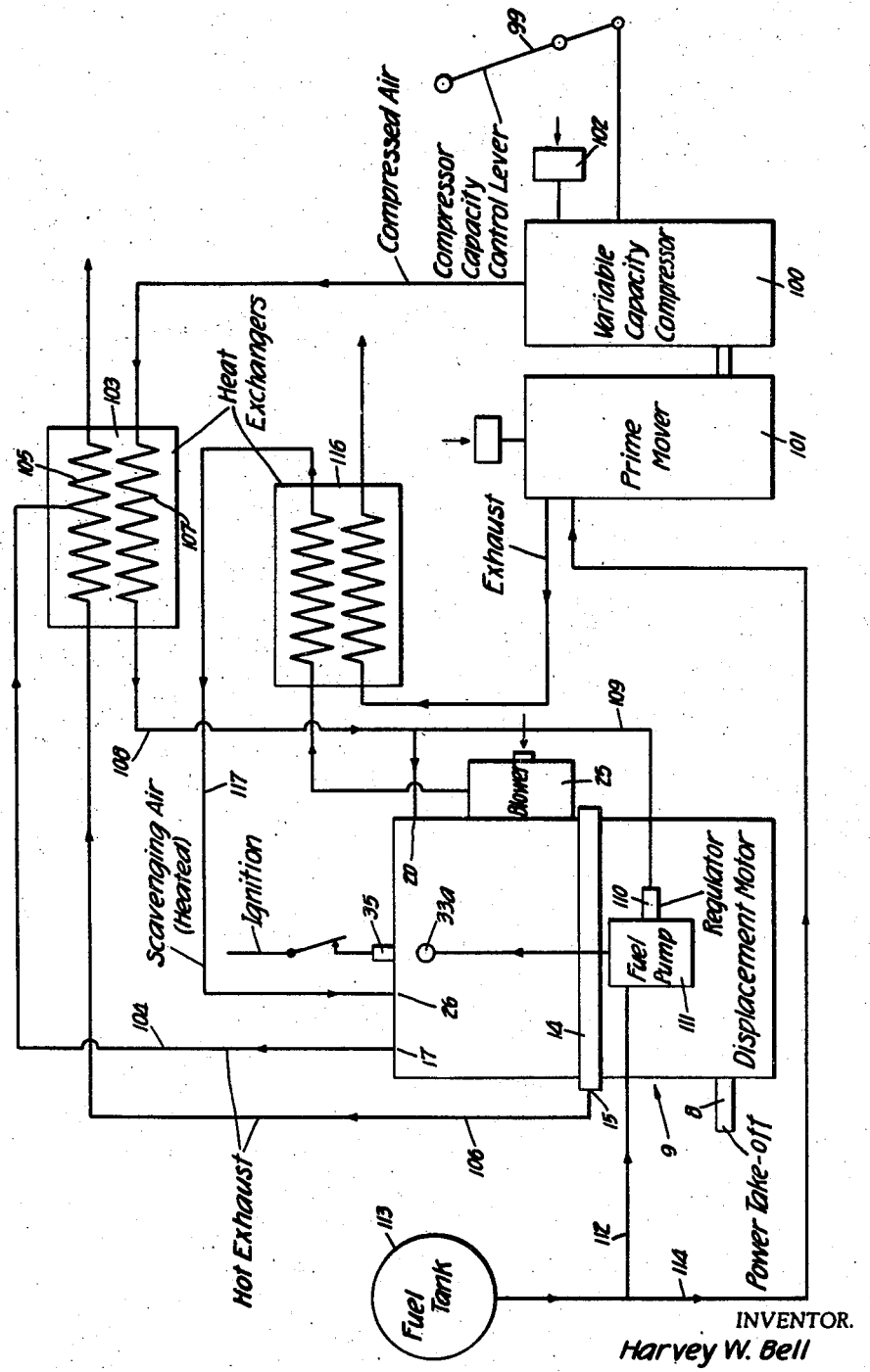

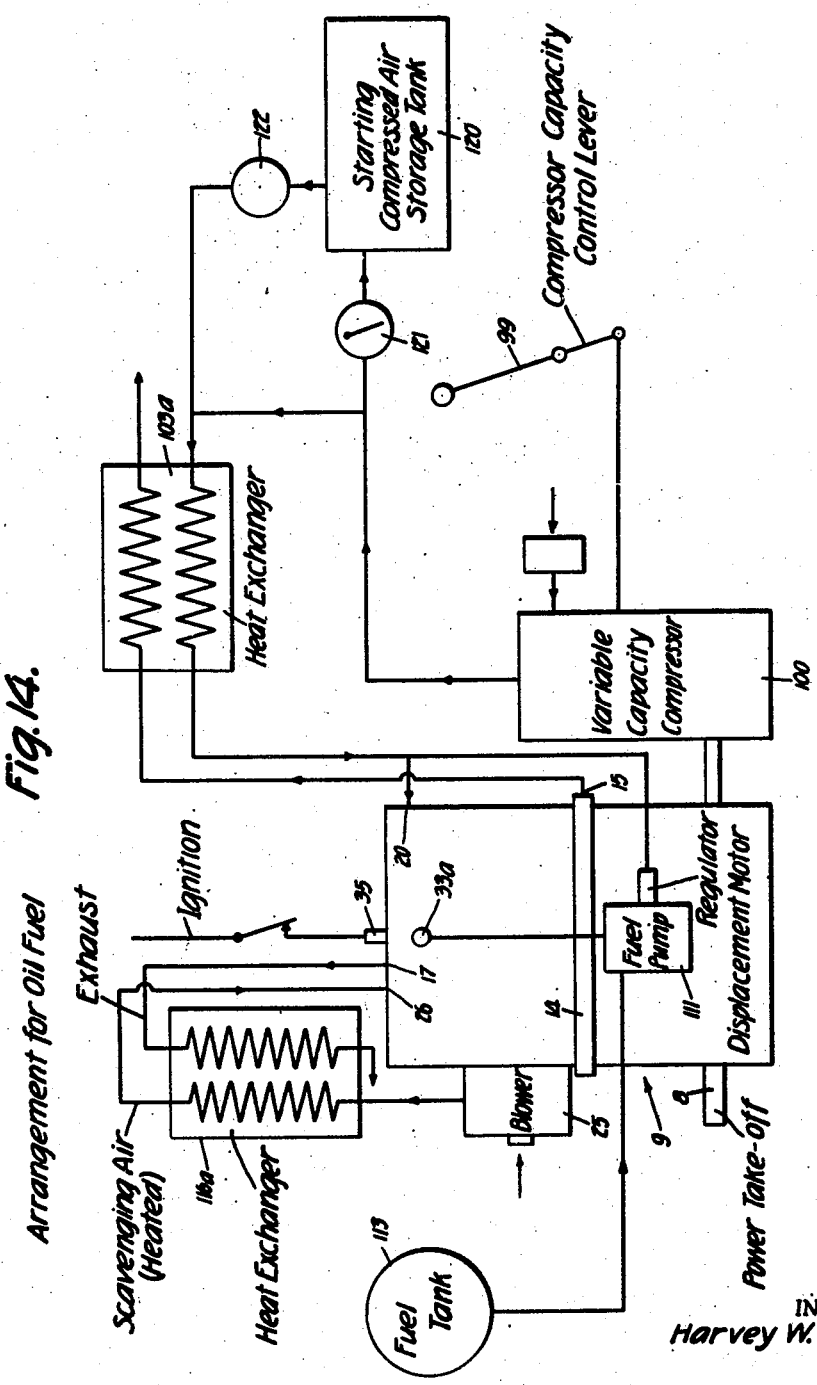

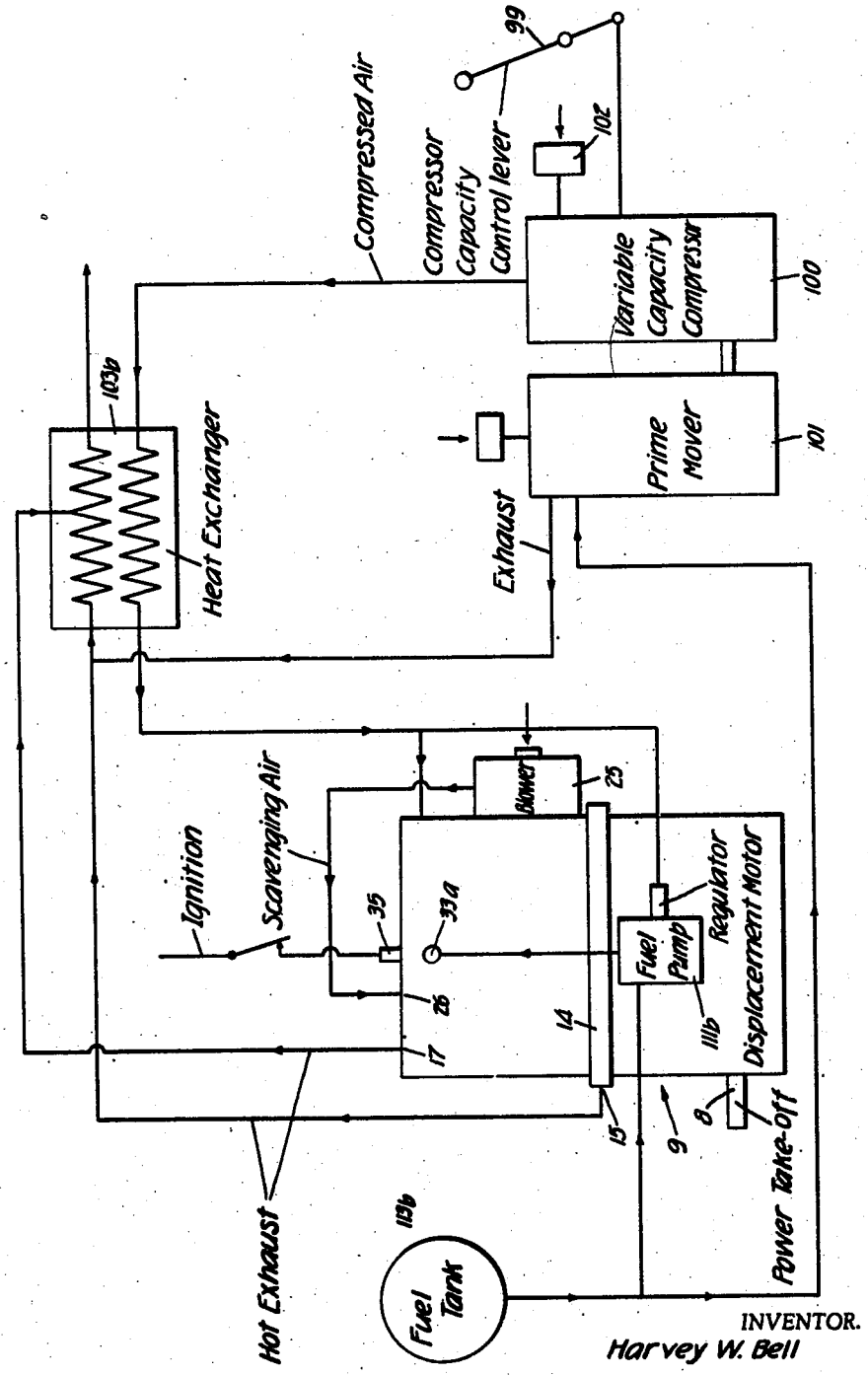

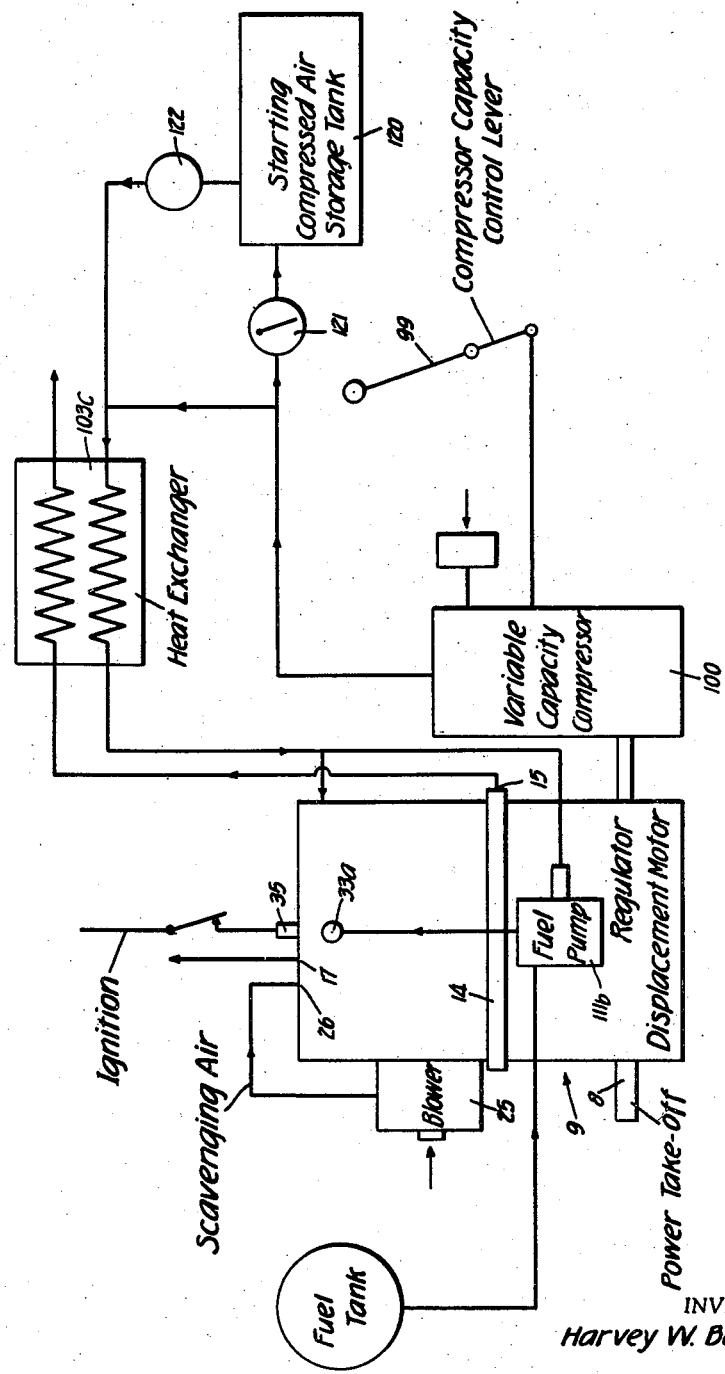

Patented July 26, 1949

2,477,230

UNITED STATES PATENT OFFICE 2,477,230

INTERNAL-COMBUSTION ENGINE

Harvey W. Bell, Yonkers, N. Y.

Application July 25, 1946, Serial No. 686,200

33 Claims. (Cl. 123—65)

The present invention relates to internal combustion engines, and also to power generating systems which include such engines.

One object of the present invention is to provide an internal combustion engine which can start against a connected load even if the torque requirement is very high.

Another object is to provide an internal combustion engine which can meet all torque-speed requirements of, for example, a locomotive or an automobile without a clutch and variable ratio transmission or an electric drive.

Another object is to provide an internal combustion engine which has a high thermal efficiency, and which can be connected to its load as a steam or air engine would be connected.

Another object is to provide an internal combustion engine which can start against a maximum load and operate equally well in forward and reverse.

In carrying out certain features of the present invention, the engine has a series of exhaust cylinder ports adapted to be uncovered by the piston near the end of its working stroke, a mechanically operated exhaust valve at the head end of the cylinder, a mechanically operated compressed working air inlet valve at the head end of the cylinder, and a valve controlled passage for admitting scavenging air into said cylinder. A portion of the scavenging air admitted after each working stroke is desirably in compressed form, and is heated to aid combustion. This scavenging air is advantageously admitted into the combustion chamber of the engine through an automatic valve actuated by pressure differences on its two sides. The use of an automatic scavenging air inlet valve eliminates the possibility of this valve opening before the pressure in the cylinder is lower than that of the scavenging air, and therefore avoids the danger of reverse flow through this valve, as might be the case if this valve was mechanically operated.

In carrying out the process of the present invention, the piston first uncovers the exhaust cylinder ports and reduces the pressure in the cylinder before the mechanically operated exhaust valve in the head end of the cylinder is opened. If the procedure were reversed, the mechanically operated valve at the head end of the cylinder would have to be opened against a very high pressure during full gear operation, and would have to be of the balanced type. The provision of such a balanced valve is avoided by the arrangement of the present invention.

A variable cut-off valve gear controlling the operation of the mechanical exhaust valve and the compressed working air inlet valve, makes possible the trapping and compression of variable volumes of the scavenging air before the high pressure working air is admitted at the beginning of each working cycle. This makes it possible to begin fuel injection into fresh, partly compressed air before the beginning of the working stroke, and in this way offset ignition lag, and insures combustion at the beginning of each working stroke, or sooner if desired for high speed operation.

After the piston uncovers the exhaust cylinder ports near the end of the working stroke, and after the pressure in the cylinder falls nearly to that of the atmosphere, the exhaust valve at the head end of the cylinder is mechanically opened, and remains open during varying first portions of the return or exhaust stroke. Scavenging air being under pressure, opens the automatic scavenging air inlet valve as soon as the pressure of the gas in the cylinder falls, after the cylinder ports are uncovered, and flows into the cylinder, and at first out through the two exhausts, and later, after the exhaust cylinder ports are again covered by the piston, it continues to flow into the cylinder and out through the open mechanical exhaust valve, until said latter valve closes. After this closure of the mechanical exhaust valve, the scavenging air trapped in the cylinder is compressed by the piston, so that the pressure in the cylinder rises quickly. As soon as the pressure of the air in the cylinder exceeds that of the scavenging air, the automatic scavenging air inlet valve closes, and remains closed until the pressure again falls.

When the engine is starting and while it is running at low speeds, the valve gear is adjusted so that the mechanical exhaust valve at the head end of the cylinder does not close until the piston has nearly completed its in or exhaust stroke. Under this condition, almost all of the air for combustion and operation of the engine is supplied by the compressor through the compressed working air inlet valve. As the engine speed increases, its valve gear is adjusted to close the exhaust valve sooner during the in or exhaust stroke of the piston, so that more of the fresh scavenging air will be trapped and compressed in the cylinder before the working compressed air from the compressor is admitted through the working air inlet valve at the beginning of the working stroke. This reduces the volume of compressed air demanded of the compressor per stroke of the engine, and enables the compressor to supply a smaller volume of air at a higher pressure for the same compressor work, so that greater power and speed is achieved.

One of the advantages of the variable cycle feature of the present invention is the reduction it affords in the size of the compressor required for a given power at maximum speed.

Another important advantage of my variable cut-off valve gear is that with it, the engine may be fully reversed, since my gear is of the type which operates exactly the same regardless of the direction of rotation of the crank shaft of the engine.

As another feature in connection with the power generating system of the present invention, there is employed a variable capacity compressor for supplying working air to the internal combustion engine. This variable capacity compressor may be operated from the internal combustion engine of the present invention, or may be operated by a separate prime mover.

The system of the present invention may be used as a variable ratio power amplifying torque converter for locomotives, trucks and buses. For this purpose, it is thought practical to employ air pressures up to 435 p. s. i. for starting and heavy pulling. With this maximum pressure and full stroke operation of the engine, the necessary starting torques can be obtained with the system of the present invention without employing excessively large engine cylinders, and their number need be no more than four.

With the variable cut-off gear of the present invention, there is obtained the highest possible thermal efficiency with the least number of cylinders. Without a variable cut-off of the engine combustion air admission valve, the engine would always have to operate with practically full stroke admission of air, because otherwise it would be unable to start under full load. If the engine were provided with a great number of cylinders, it could be always operated with the shortest cut-off, but this is not thought to be practical, especially as there would not only have to be many cylinders, but they would have to be quite large as well.

If the engine valve gear were fixed for continuous full stroke combustion air admission, very little expansion of the working gases would be possible, and as a result the efficiency of the engine would be poor. Poor efficiency during short starting periods is not a serious objection, but is an objection during normal operating conditions. In addition, it is thought that with full stroke operation, there must be a great excess of air to prevent excessive cylinder wall and piston temperatures, and this again reduces the thermal efficiency.

With a variable cut-off valve gear, the engine can develop a high torque for starting, but during normal operation, can operate with nearly complete expansion of the working gas. High temperatures of combustion can be employed under normal conditions because they will only occur for an instant at the beginning of the working stroke, after which the temperature will fall, due to expansion, until, at the end of the stroke, it will be no more than 500° F. to 600° F., and the mean temperature will be in the neighborhood of 2000° F., which is considered to be not too high for proper lubrication. It is estimated that these would be the temperatures if the maximum temperature at the beginning of expansion is approximately 3500° F. Operating non-expansively, the temperature at the beginning of the working stroke may be as high, but instead of being reduced before the end of the stroke by expansion, it is reduced by the admission of excess air. In this way, the mean temperature of the working gas is maintained approximately constant, regardless of the cut-off and under no condition of operation is it high enough to cause lubrication trouble.

Various other objects, features and advantages of the invention will be apparent from the following particular description, and from an inspection of the accompanying drawings, in which—

Fig. 2 is a vertical section of a portion of the internal combustion engine;

Fig. 3 is a top plan view on an enlarged scale of the savenging air inlet valve of the internal combustion engine;

Fig. 4 is a vertical elevation partly in section of the scavenging air pump with associated reverse flow control valve;

Figs. 5, 6, 7, 8 and 9 show diagrammtically different phases respectively of the internal combustion engine set for full speed;

Figs. 10, 11 and 12 show diagrammatically different phases respectively of the internal combustion engine set for slow speed corresponding to the setting of the valve gear shown in Fig. 1;

Fig. 13 is a diagram of the layout of a form of power generating system, which operates on oil fuel, which includes a variable capacity compressor for the working air of the internal combustion engine driven by a prime mover independent of said engine, and which embodies the present invention;

Fig. 14 is a diagram of the layout of another form of power generating system operating on oil fuel, and embodying the present invention, the variable capacity compressor for the internal combustion engine being driven, however, by said engine;

Figure 1:
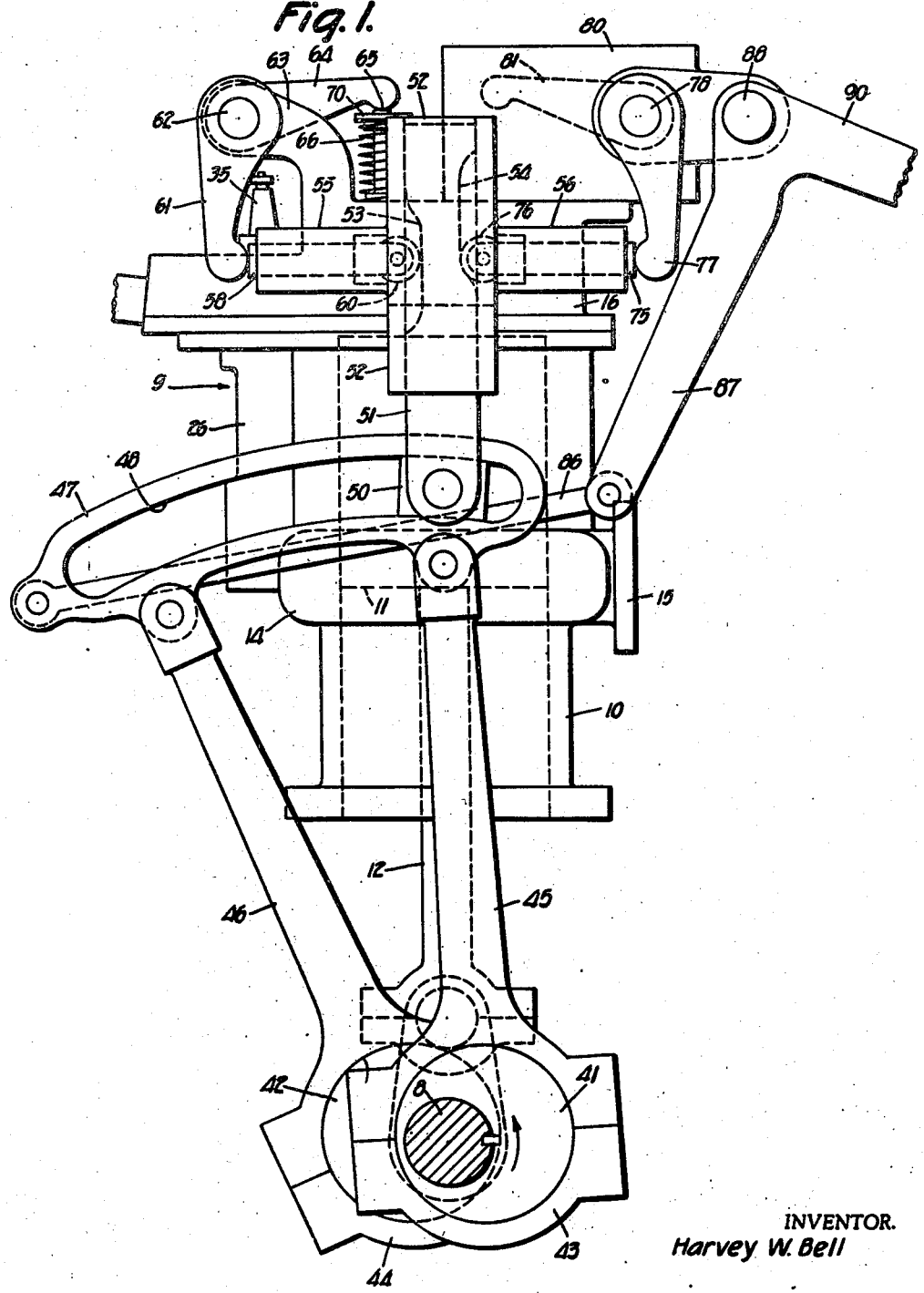
Fig. 1 is a front elevation of a portion of an internal combustion engine embodying the present invention, and shown with its valve gear set for full stroke and slow engine speed.

Fig. 15 is a diagram of the layout of still another form of power generating system embodying the present invention, said system operating on gas or a volatile fuel such as gasoline, and having the variable capacity compressor for the internal combustion engine driven by a prime mover independent of said engine; and Fig. 16 is a diagram of the layout of a further form of power generating system operating on gas or a volatile fuel such as gasoline, and embodying the present invention, the variable capacity compressor for the internal combustion engine being driven by said engine.

Referring to Figs. 1 to 3 of the drawings, the internal combustion engine 9 of the present invention comprises a cylinder 10, in which is slidably reciprocated a piston 11 connected to the usual crank shaft 8 through a connecting rod 12. The engine is provided with a series of exhaust cylinder ports 13 uncovered by the piston 11 at the end of its working stroke, as shown in Fig. 2, and communicating with an annular manifold cylinder passage 14 having an outlet 15.

Connected to the head end of the cylinder 10 is a valve block 16 defining an exhaust valve passage 17 controlled by an exhaust valve 18, shown of the poppet type. The valve block 16 also defines a compressed working air inlet passage 20 controlled by a valve 21, also shown of the poppet type. The two valves 18 and 21 are operated mechanically in time relationship with the movement of the piston 11 from a valve gear 40 in a manner to be described.

The scavenging air for the engine 9 is delivered under pressure by a blower 25 (Fig. 4) through a passage 26 (Fig. 2) along the side of the cylinder 10 through a scavenging air inlet valve 27, and into the head end of the combustion chamber of the cylinder 10. The scavenging air inlet valve 27 is of the type operated automatically by the pressure differential on both sides thereof, and is shown in the form of a disc 28 which cooperates with a bushing seat member 30 threaded into the upper end of the scavenging air passage 26, and which is guided for vertical movement into opened or closed position through two or more headed pins 31 secured to the bushing seat member 30, and passing through the valve disc 28 with a slide fit.

The valve block 16 is shown defining a fuel inlet passage 33 in which is secured an injector nozzle 33a connected to a fuel pump to be described, and adapted to deliver fuel into the head end of the cylinder 10. Extending into the flow passage of the injected fuel is an ignition element, shown in the form of a spark plug 35 operated from an ignition system with a timer, so that the start of combustion can be timed under all operating conditions. Fuel injection is effected in time sequence with the movement of the piston 11 in a manner to be described.

In Fig. 4 is shown the pump or blower arrangement by which scavenging air under pressure may be delivered to the cylinder 10. The blower or pump 25 is arranged to be driven from the crank shaft 8 of the engine, which is suitably connected to a shaft 36, and is operated to deliver air in either direction of rotation of said crank shaft. The air for scavenging is delivered from the atmosphere through a filter into a passage 37, through an inlet line 37a and into the intake of the pump 25. The pump 25 has an outlet or discharge line 38 leading to a reversing valve 39 provided with a delivery line 39a connected to a heater to be described. The heated scavenging air is then delivered to the passage 26 of the engine.

The reversing valve 39 may be controlled by a handle 39b, and is of the rotary type, so that by manipulation of said handle 39b, the valve 39 can be set in accordance with the direction of rotation of the engine. When the engine 9 is reversed, the flow through the lines 37 and 38 is reversed, so that the line 38 becomes the intake line for the pump 25, while the line 37 becomes the discharge line therefor. The handle 39b can be manually manipulated, or, if desired, may be automatically controlled in accordance with the direction of rotation of the crank shaft of the engine, so that the reversing valve 39 will be automatically set for flow in either direction.

If desired, the scavenging air pump 25 can be driven by an independent prime mover, in which case no reversing valve device need be provided, since the pump would operate in proper direction independently of the direction of rotation of the engine.

The exhaust valve 18 and the working air inlet valve 21 are operated in time relationship with the operation of the piston 11 through a valve gear 40, which is shown of the Stephenson link motion type. The ideal timing of the opening and closing of the inlet and exhaust valves for different conditions of speed and load is almost exactly the same for the internal combustion engine of the present invention as for steam locomotives. The Stephenson valve gear used on many steam locomotives is not ideal for them because it does not provide uniform action when the cylinders are double-acting, but it is ideal for the operation of the valves of the internal combustion engine of the present invention, because it is single-acting. It provides exactly the timing required, and works exactly the same in forward and reverse.

The Stephenson valve gear 40 comprises a pair of eccentrics 41 and 42 keyed or otherwise secured to the crank shaft 8, and rotatably mounted in respective eccentric straps 43 and 44 secured to one end of eccentric rods 45 and 46 respectively. The other ends of these eccentric rods 45 and 46 are pivotally connected to a link 47 provided with an arcuate slot 48, in which is adjustably mounted a link block 50. The link block 50 has pivotally connected thereto a cam 51, which is slidably mounted in a housing 52 connected to the valve block 16, and which has a pair of cam conformations 53 and 54 on opposite sides thereof. Extending from opposite sides of the cam housing 52 are a pair of guides 55 and 56. In the tubular guide 55 is a tappet 58 having at one end a roller 60 adapted to engage the cam conformation 53 of the cam 51. The other end of the tappet 58 engages a crank lever 61 fixed to a rock shaft 62 journalled in a bracket 63 forming an extension of the valve block 16. Also rigid with the rock shaft 62 is a crank lever 64 bearing at its outer end against a valve stem 65 connected to the exhaust poppet valve 18. This valve stem is urged upwardly in position to maintain the exhaust valve 18 closed by means of a coil spring 66 encircling the valve stem 65, and bearing at one end against a shoulder 67 on the valve block 16, and bearing at its other end against a washer 70.

In the tubular guide 56 is a tappet 75 carrying at one end a cam roller 76 engaging the cam conformation 54 on the cam 51. At its other end, the tappet 75 engages a crank lever 77 affixed to a rock shaft 78 journalled in a housing 80 in a manner and for the purpose shown and described in my copending application Serial No. 686,201, filed July 25, 1946. Also affixed to the rock shaft 78 and disposed in the box or housing 80 is a crank lever 81 bearing at its free end against the end of a valve stem 82 secured to the working air inlet poppet valve 21. This valve stem 82 is urged upwardly to normally urge the valve 21 into closed position by a coil spring 83 seated at one end against the inner face of the wall of the housing 80, and bearing at its other end against a washer 84.

In the operation of the valve gear, as the crank shaft 8 is rotated, the link 47 is rocked and oscillated bodily to cause reciprocation of the cam 51, so that the valves 18 and 21 are mechanically and automatically operated in time relationship according to the phase of operation of the piston 11.

In order to permit adjustment of the valve gear by which the timing in the operation of the valves 18 and 21 is varied, there is provided an adjusting link 86 pivotally connected at one end to one end of said link 47, and pivotally connected at its other end to a lever arm 87 having a pivotal mounting 88. Rigid with the arm 87 is an adjusting handle 90. By manipulation of this handle 90 into selective angular position according to the setting of the valve gear desired, the link 47 is moved to bring the link block 50 in selective position along the link slot 48.

Although the adjustment in the Stephenson link is shown effected by manual control, it must be understood that as far as certain aspects of the invention are concerned, this adjustment may be made automatically to increase the compression ratio of the engine as its speed increases and advance the admission valve cut-off. This automatic adjustment may be accomplished, as for example, by a centrifugal or other type of governor having a connection to the member 90.

In the position shown in Fig. 1, the valve gear 40 is set for full stroke and slow speed. In this setting of the valve gear 40, the link block 50 is located at the right-hand end of the link slot 48. This causes the exhaust valve 18 to remain open during almost the entire in or exhaust stroke of the piston 11, and causes the compressed working air inlet 20 to be opened during the major portion of the working stroke of said piston.

By moving the handle 90 counterclockwise from the position shown in Fig. 1, the link 47 can be shifted on the link block 50. As this handle 90 is so rotated, the period of the exhaust or in stroke of the piston 11 during which the exhaust valve 18 is open, is gradually reduced, so that when the link block 50 is near the middle of the link slot 48, the exhaust valve 18 will have an early shut-off with respect to the in or exhaust stroke of the piston 11, and the working air inlet valve 21 will close earlier during the working stroke of the piston 11.

When the link 47 is adjusted as far as it can be moved beyond this mid-point position relative to block 50, the valve gear will be set for full stroke reverse rotation of the engine, and from this starting reverse position, the link 47 may be moved further to the left (Fig. 1) towards the mid-position to effect shorter cut-offs of the inlet and exhaust valves as the engine speed increases.

When starting the engine of the present invention, especially if high starting torque is required, the valve gear will be set to admit high pressure air through the valve 21 during most (about 90%) of each working stroke of the piston, and its exhaust valves will remain open during about 75% of the return stroke of the piston, closing, however, in time to trap and partly compress some of the previously admitted scavenging air. It is desirable in accordance with the present invention, to compress the trapped air comparatively little during starting when heavy slow speed pulling is required.

Figs. 5, 10, 11, 12 and 9 show the successive phases of operation of the valves 18, 21 and 27 when the engine is starting, as for example, when starting a locomotive or motor vehicle. Assuming that the piston is in initial dead-center phase shown in Fig. 5, in which the piston 11 is at the end of its working stroke, the exhaust ports 13 will be uncovered by the piston 11, and the valve 27 will be open as a result of the low pressure created in the combustion chamber of the cylinder 10, so that scavenging air is being admitted into said cylinder. After these exhaust ports 13 have been uncovered, and while the piston 11 is in the extreme stroke phase shown in Fig. 5, the exhaust valve 18 is opened, while the compressed air inlet valve 21 is maintained closed. As the piston moves upwardly during the in or exhaust stroke, the scavenging air is exhausted through the opened exhaust valve 18, until the piston reaches near the end of its in or exhaust stroke, as shown in Fig. 10. At that instant, the exhaust valve 18 closes, trapping a little of the scavenging air and compressing it sufficiently to cause the scavenging air inlet valve 27 to close almost immediately after said exhaust valve has been closed. As the piston reaches the end of its in stroke, as shown in Fig. 11, the compressed air inlet valve 21 is just about to open. This valve will remain open as the piston 11 is moved downwardly during its working stroke. The fuel and compressed air injected during this working stroke of the piston 11 is ignited by the ignition element 35.

When the piston 11 reaches near the end of its working stroke in the approximate phase shown in Fig. 12, the compressed air inlet valve 21 is closed.

When the piston 11 reaches very near the end of its working stroke, it will start to uncover the exhaust cylinder ports 13, as shown in Fig. 9, and when the pressure in the combustion chamber has been reduced sufficiently, the mechanical exhaust valve 18 is opened.

As the speed of the locomotive or other traction device driven by the engine 9 increases, the engineer will adjust the valve gear 40 for an earlier cut-off of the high pressure air during the working stroke, and an earlier closing of the exhaust valves during the in or exhaust stroke, thereby causing the engine to run more expansively, and allowing a greater volume of scavenging air to be trapped and compressed. At maximum speed and for maximum efficiency, the high pressure air should be cut off sufficiently early during the working stroke to insure expansion of the working gas to approximately atmospheric pressure before the piston uncovers the cylinder exhaust ports 13 and the mechanically operated exhaust valve 18 opens.

With full speed operation, the mechanically operated exhaust valve 18 should close soon enough during the return stroke of the piston to trap enough scavenging air, so that before the high pressure air inlet valve 21 opens, it will be compressed in the clearance space of the cylinder to a pressure which is great enough when the combustion begins, to approximate the pressure of the working air to be admitted through said valve 21. The trapped scavenging air should never be compressed to such a high pressure that after the fuel is injected and combustion begins, its pressure will exceed that of the working high pressure air. At full speed, the trapped scavenging air is desirably compressed to only about one-third the pressure of the working air, since the combustion just before the working air inlet valve 21 opens will cause the pressure in the combustion chamber to increase to approximately that of the working air to be admitted.

When running with lower than maximum air pressures, the engineer will set the valve gear for a later cut-off of the inlet valve 21 and exhaust valve 18 to prevent over-expansion and over-compression.

Figs. 5, 6, 7, 8 and 9 show the different successive phases of the engine when set for full speed and early closure of the mechanically operated exhaust valve 18 during the exhaust or in stroke. Fig. 5 shows the piston 11 at the end of its working stroke after the exhaust cylinder ports 13 have been uncovered by said piston. At this phase of engine operation, the scavenging air inlet valve 27 is opened, the mechanically operated exhaust valve 18 is open, and the compressed working air inlet valve 21 is closed. After the crank is moved about 90°, as shown in Fig. 6, and the piston 11 has covered the cylinder exhaust ports 13, the exhaust valve 18 is mechanically closed, so that the scavenging air is trapped in the combustion chamber. Further movement of the piston 11 compresses this trapped scavenging air, so that soon after the exhaust valve 18 is closed, the scavenging air inlet valve 27 is also closed by the pressure of the scavenging air in the cylinder. As the piston 11 continues its in or exhaust stroke, the scavenging air is compressed, and fuel is injected, so that combustion takes place towards the last phases of the in stroke. This combustion builds up the pressure in the combustion chamber approximately to but below the pressure of the compressed working air, by the time the piston 11 reaches the end of the in stroke shown in Fig. 7. When the piston 11 reaches almost the end of its in stroke, as shown in Fig. 7, the compressed air inlet valve 21 is mechanically opened, and remains open for part of the working stroke, until the piston reaches the approximate position shown in Fig. 8. In this position, the compressed air inlet valve 21 is closed, and the piston 11 is propelled by the expansive action of the combustion gases in the cylinder until the pressure in said cylinder is close to atmospheric in the approximate phase position shown in Fig. 9. In this phase position, the cylinder exhaust ports 13 are just beginning to be uncovered, and just as soon as the pressure in the cylinder is reduced substantially by the opening of these exhaust ports, the exhaust valve 18 is mechanically opened to cause some of the exhaust to be delivered through the exhaust port 17.

The fuel injection system which is desirably used for locomotives, is, in some respects, similar to that used with many Diesels. However, mechanical operation of the fuel pump would be too slow, especially with low locomotive speeds. It is desirable to use for the purpose of the present invention, a separate fuel pump for each cylinder, and to operate the pump by the pressure of the air in the cylinder to which it is attached. This operation is effected by connecting the plunger of the pump to the piston of an air motor, the cylinder of which is in constant communication with the engine cylinder. Air pressure will work the plunger of the pump and force fuel into the engine cylinder while a spring will return the plunger when the pressure in the engine cylinder falls.

At low locomotive speeds and with full gear stroke operation, relatively little scavenging air will be trapped, but its pressure will be sufficient to operate the fuel pump just before the working air inlet valve 21 opens. At higher speeds, when the trapped scavenging air is compressed to a higher final pressure, fuel injection will begin earlier. This is as it should be, because relatively late injection is desirable at low speeds, while earlier injection is needed at higher speeds to offset ignition lag.

The fuel injection system employed in connection with the present invention, is desirably similar to that shown and described in my copending application Serial No. 686,201, filed July 25, 1946.

The amount of fuel injected per stroke will be approximately the same for all working air valve cut-offs for any one working air pressure. The fuel injected with the shortest cut-off of compressed working air is desirably adjusted to produce a combustion temperature at the beginning of the working stroke of approximately 3500° F. With later cut-offs, more compressed working air will be admitted during each working stroke, but the mean temperature of the working gas will be about the same, because there will be less expansion of the working gas with later cut-offs, i. e., the mean temperature per stroke will be approximately the same regardless of the cut-off of the compressed working air, because when the cut-off is short, and there is little or no excess air, the mean temperature will be less than the maximum due to expansion, whereas with full stroke operation, there will be little or no expansion but more excess air. Therefore, the amount of fuel injected per stroke will be about, if not exactly, the same, for all compressed working air cut-offs, when the working air pressure is the same, and it will only be necessary to change the adjustment of the fuel pump, when the working air pressure is changed. This adjustment is desirably made automatically by a piston in an air cylinder working against a spring with the air cylinder connected to the working air supply pipe, so that when the working air pressure is at a maximum, the maximum amount of fuel will be injected per stroke, regardless of the cut-off, while less and less fuel will be injected as the working air pressure is reduced, until when there is no gauge pressure, no fuel will be injected.

In other words, the mean temperature of the working gas is maintained approximately constant with all cut-offs and all working air pressures by increasing the excess air admitted per stroke, as the ratio of expansion is reduced, and by varying the amount of fuel injected per stroke in proportion to the pressure of the air delivered to the engine by the compressor.

As far as certain aspects of the present invention are concerned, for many uses a conventional Diesel fuel injection system may be employed.

It should be noted that with the engine of the present invention, scavenging air flows through the cylinder, and exhausting continues during a longer period (138° to 200° of crank travel) than with a two-cycle Diesel hitherto known, in which scavenging and exhausting take place for only about 96° crank travel. This results in better scavenging and cooling for the engine of the present invention.

The engine of the present invention differs in many respects from others hitherto known. For example, only a fraction of the air it employs for combustion is compressed in its power cylinders, the greater portion being compressed in separate cylinders and admitted during its working strokes.

Unlike Diesel and Otto engines, it can develop its maximum torque at zero R. P. M., and this torque can be almost anything required.

Unlike the Brayton engine, its air compressor is of the variable capacity type, its cylinders are scavenged by air and variable volumes of this are trapped and compressed and supplement the air supplied by the compressor.

With its valve gear, its expansion ratio may be varied and it may be fully reversed. It can be designed to burn almost any liquid fuel or gas.

In Fig. 13 is shown the application of the engine 9 of the present invention to a power generating system which is operated by oil fuel, and which, for example, may be the power plant for driving a locomotive. Compressed working air is delivered to the engine 9 through its air inlet valve 21 by means of a variable capacity compressor 100, which is desirably of the fixed stroke type shown and described in my copending application Serial No. 497,781, filed August 7, 1943, now abandoned, and which has the advantages described in said application and those indicated in copending application Serial No. 532,121, filed April 21, 1944. The compressor 100 is desirably of the variable effective displacement type. By a compressor of this type is meant a compressor having control means for varying the effective length of the compression stroke by holding an unloading valve open during varying first portions of that stroke or during the whole of the stroke, if it is desired to unload completely the compressor. The output of such a compressor can be infinitely varied without throttling its inlet, which is an inefficient means of control and without changing its R. P. M. which would require an expensive variable ratio drive.

The compressor 100 is operated by a prime mover 101 which is independent of the engine 9, and which may be a Diesel, a Bell or an engine of any suitable type, and its output is controlled from a lever 99. Air enters through inlet 102 from the atmosphere, and is compressed in compressor 100.

The compressed air from the compressor 100 is desirably heated before delivery to the engine 9, and for that purpose, it passes through a conduit 107 in a heat exchanger 103 heated by the exhaust from the engine 9. For heating the heat exchanger 103, the exhaust engine port 17 is connected to a line 104 joined to an intermediate point of a flow conduit 105 in said heat exchanger. A line 106 from the outlet 15 of the exhaust cylinder ports 13 connects into the inlet end of this flow conduit 105, which is in heat exchange counterflow relationship with the compressed air flow conduit 107 in the heat exchanger 103. The exhaust from this exchanger conduit 105 may be discharged into the atmosphere as shown, or may be employed for further heating.

The compressed air from the air outlet of the heat exchanger 103 is delivered by a line 108 to the air inlet port 20 of the engine 9, and a branch line 109 from said air supply line is employed in connection with a regulator 110 to control the output of a fuel pump 111, which injects fuel into the engine through the inlet 33a, and which is operated by the pressure in the engine cylinder. The fuel injection system is similar to that already described, and similar to that shown and described in copending application Serial No. 686,201 above referred to.

The fuel pump 111 has its intake connected by a line 112 to a fuel tank 113, which also supplies by a line 114, fuel to the internal combustion engine 101 driving the compressor 100.

At least when starting, compressed scavenging air from the blower 25 is desirably heated before delivery to the cylinder of the engine 9. For that purpose, the scavenging air from the blower 25 passes through a heat exchanger 116 heated by the exhaust from the internal combustion engine 101. The air outlet of the exchanger 116 connects into the scavenging air passage 26 by a line 117.

Fig. 14 shows a power generating system, in which the variable capacity compressor 100 is driven by the engine 9. The compressed air from this compressor 100 passes through the heat exchanger 103a and into the air inlet port 20 of the engine 9, and also controls the output of the fuel pump 111, as described in connection with the arrangement of Fig. 13. The heat exchanger 103a is heated by the hot exhaust from the outlet 15 of the cylinder exhaust ports 13.

A storage tank 120 is utilized for compressed air which is employed when starting the engine. This storage tank 120 has its inlet connected to the main compressed air supply line through a check valve 121 which is automatically opened when the pressure in the tank 120 falls below that in said supply line. The outlet side of the storage tank 120 is connected through a valve 122 with the main compressed air supply line.

The scavenging air from the blower 25 is heated in the heat exchanger 116a before delivery to the engine 9. This heat exchanger 116a is heated by the exhaust of the engine discharged through the exhaust port 17 at the head end of the engine cylinder.

In Fig. 15 is shown the application of the internal combustion engine 9 in a system in which the engine is operated by gas or a volatile fuel such as gasoline. This fuel, for example, may be ordinary illuminating gas, or may be fuel which is normally in liquid state, such as gasoline. In Fig. 15, the system is shown operated by such fuel as illuminating gas. If gasoline or other volatile fuel is employed as the motive medium, a suitable carbureter at the inlet of the fuel pump 111b is provided, and a rich mixture of gasoline and air may be compressed and injected into the engine cylinder in the same manner as fuel oil alone is injected, except for the proportions of the fuel and air.

In the system shown, the variable capacity compressor 100 is operated from the prime mover 101, and the air compressed by said compressor is passed through a heat exchanger 103b before being delivered to the engine 9. The exhaust from the prime mover 101 and the exhaust from the engine 9 are passed through the heat exchanger 103b in heat exchange counterflow relationship with the compressed working air. The gaseous fuel is delivered from a fuel tank 113b, and serves as a fuel supply means, not only for the fuel pump 111b of the engine 9, but also for the prime mover 101.

In the arrangement as shown in Fig. 15, the scavenging air from the blower 25 is not heated before admission into the engine 9.

In Fig. 16 is shown another power plant arrangement which may be employed in connection with a gaseous or volatile fuel. In this arrangement, the variable capacity compressor 100 is driven directly by the engine 9, and the compressed air from said compressor is passed through the heat exchanger 103c before delivery to the engine 9. The compressed working air is heated in the exchanger 103c by the hot exhaust which is discharged from the piston controlled ports 13. The exhaust from the exhaust port 17 is released to the atmosphere.

The compressed air from the compressor 100 is made to maintain a storage tank 120 filled with starting compressed air, as in the system of Fig. 14.

In the systems shown in Figs. 13, 14 and 15, the exhaust from the exhaust port 17 and the cylinder ports 13 is used for exchange heating. The exhaust through port 17 is not as hot as the exhaust through ports 13 because the former exhaust is later than the latter and because more scavenging air is mixed with the burned gases leaving port 17. This is why the exhaust from port 17 is used for less important heating and is discarded altogether in the arrangement shown in Fig. 16.

In the systems described, control of the speed and torque developed may be solely by the operator's control of the output of the compressor if the latter is driven by the engine and the cut-off of the two mechanically operated engine valves is taken care of by a governor. If the latter is not the case, then the operator's control will be by his joint control of the output of the compressor and his control of the cut-off of the engine valves.

If the compressor is separately driven, the operator's control may be jointly by his control of the compressor, his control of the compressor engine and his control of the cut-off of the engine valves, or, if the cut-off of the engine valves and the compressor engine are both controlled by governors, then the operator's control may be solely by his control of the output of the compressor. In short, the operator may have only one control to manage or there may be two or three for him to manage. In the case of a locomotive, it is desirable that the compressor engine be controlled by a governor but that the cut-off of the engine valves in addition to the control of the output of the compressor be manually controlled.

In every case reversing will be by manual control of the engine valve gear. The scavenging air flow valve may be linked to the engine valve gear control lever so that the two will work together.

As many changes can be made in the above apparatus and method, and many apparently widely different embodiments of this invention can be made without departing from the scope of the claims, it is intended that all matter contained in the above description or shown in the accompanying drawings shall be interpreted as illustrative and not in a limiting sense.

What is claimed is:

1. A method of generating power in an internal combustion two cycle engine, which comprises operating said engine at slow speed in accordance with a cycle, in which compressed air and fuel are injected and ignited during the working stroke and scavenging air is admitted into said engine near the end of each working stroke, and as the speed of said engine increases, reducing the amount of compressed air admitted during each power stroke, and increasing the amount of scavenging air trapped and compressed during each exhaust or in stroke.

2. In an internal combustion two cycle engine, the combination comprising a cylinder, a piston in said cylinder, means for admitting scavenging air into said cylinder, a mechanically operable exhaust valve for said cylinder, means for opening said exhaust valve and for maintaining it open during the exhaust stroke of said piston, means for varying the closure phase of said exhaust valve with respect to the exhaust stroke, to vary the compression ratio, means for injecting and igniting fuel near the beginning of each power stroke, a mechanically operable air inlet valve for admitting compressed working air into said cylinder during the power stroke, and means for varying the closure phase of said latter valve in the power stroke to vary the amount of compressed working air admitted during each power stroke.

3. In an internal combustion two cycle engine as described in claim 2, the combination comprising a variable capacity compressor for supplying compressed working air to said air inlet valve.

4. In an internal combustion two cycle engine as described in claim 2, the combination comprising a variable capacity compressor for supplying compressed working air to said air inlet valve, and a prime mover separate from the main engine for driving said compressor.

5. In an internal combustion two cycle engine as described in claim 2, the combination comprising a variable capacity compressor driven by said engine for supplying compressed working air to said air inlet valve.

6. In an internal combustion two cycle engine as described in claim 2, the combination comprising means for heating the compressed working air before admitting it into said cylinder.

7. In an internal combustion two cycle engine as described in claim 2, the combination comprising means for heating the compressed working air by the exhaust from said engine before admitting said working air into said cylinder.

8. In an internal combustion two cycle engine as described in claim 2, the combination comprising a compressor for supplying compressed working air to said air inlet valve, an internal combustion motor separate from the main engine for driving said compressor, and means for heating the scavenging air from the exhaust of said motor before said scavenging air is admitted into said cylinder.

9. In an internal combustion two cycle engine as described in claim 2, the combination comprising a compressor for supplying compressed working air to said air inlet valve, an internal combustion motor separate from the main engine for driving said compressor, and means for heating said compressed working air from the exhaust of said motor before admitting said working air into said cylinder.

10. In an internal combustion two cycle engine as described in claim 2, the combination comprising a compressor for supplying compressed working air to said air inlet valve, an internal combustion motor separate from the main engine for driving said compresor, means for heating said compressed working air from the exhaust of the main engine before admitting said working air into said cylinder, and means for heating the scavenging air by the exhaust of said motor before admitting said scavenging air into said cylinder.

11. In an internal combustion two cycle engine as described in claim 2, the combination comprising a compressor for supplying compressed working air to said air inlet valve, an internal combustion motor separate from the main engine for driving said compressor, and means for heating said compressed working air from the exhaust of the main engine and of said motor before admitting said working air into said cylinder.

12. In an internal combustion two cycle engine, the combination comprising means for injecting compressed working air and fuel into the engine and igniting it during the working stroke for comparatively slow speed high torque operation, means for reducing the amount of compressed working air admitted during each power stroke as the speed of the engine increases, means for introducing scavenging air into the engine, trapping a portion thereof and compressing the trapped portion during the exhaust or in stroke, and means for increasing the amount of air trapped during the exhaust stroke, to increase the compression ratio in the engine as the speed of the engine increases.

13. In an internal combustion two cycle engine, the combination comprising means for injecting compressed working air and fuel into the engine and igniting it during the working stroke, means for varying the amount of compressed working air admitted during each power stroke, means for introducing scavenging air into the engine, trapping a portion thereof and compressing the trapped portion during the exhaust or in stroke, and means for varying the amount of scavenging air trapped during the exhaust stroke to vary the compression ratio in the engine.

14. In an internal combustion two cycle engine as described in claim 13, comprising means for operating both of said varying means in unison to decrease the amount of compressed working air admitted during each power stroke and to simultaneously increase the amount of scavenging air trapped and compressed during each exhaust stroke, and vice versa.

15. In an internal combustion two cycle engine as described in claim 13, the combination comprising a Stephenson link motion for operating both of said varying means in unison to decrease the amount of compressed working air admitted during each power stroke, and to simultaneously increase the amount of scavenging air trapped and compressed during each exhaust stroke, and vice versa.

16. In an internal combustion two cycle engine, the combination comprising a cylinder, a piston in said cylinder, said cylinder having a series of cylinder exhaust ports controlled by said piston and uncovered by said piston near the end of its power stroke, said cylinder having a passage at its head end for admitting scavenging air therein, an exhaust valve in the head end of said cylinder, means for mechanically opening said exhaust valve and for closing it during the exhaust stroke of said piston, means for varying the time of closure of said exhaust valve with respect to the exhaust stroke of said piston, and means for injecting fuel into said cylinder near the beginning of its power stroke.

17. In an internal combustion two cycle engine as described in claim 16, the combination comprising an air inlet valve at the head end of the cylinder for admitting compressed working air into said cylinder, means for mechanically opening said air inlet valve during the power stroke of the piston, means for closing said air inlet valve during the power stroke of said piston, and means for varying the time of closure of said air inlet valve with respect to the power stroke of said piston.

18. In an internal combustion two cycle engine, the combination comprising a cylinder, a piston in said cylinder, means for admitting scavenging air into said cylinder near the end of the power stroke of said piston, an exhaust valve at the head end of said cylinder, an air inlet valve at the head end of said cylinder for admitting compressed working air into said cylinder during the power stroke of said piston, means for mechanically operating said valves in unison to cause said exhaust valve to be opened during the exhaust stroke of the piston and to close during said exhaust stroke, whereby a portion of the scavenging air is trapped in said cylinder and compressed therein, and to cause said air inlet valve to be opened duirng the power stroke of said piston and to close during said power stroke, and means for adjusting said operating means to vary the time of closure of said exhaust valve with respect to the exhaust stroke of the piston, and to vary the time of closure of said air inlet valve with respect to the power stroke of said piston, whereby the amount of scavenging air trapped and compressed per stroke may be increased, and the amount of compressed working air admitted into the cylinder per stroke may be decreased simultaneously and vice versa.

19. In an internal combustion two cycle engine as described in claim 18, in which said valve operating means and said adjusting means comprises a Stephenson link motion.

20. In an internal combustion two cycle engine, the combination comprising a cylinder, a piston in said cylinder, said cylinder having piston controlled exhaust ports uncovered by said piston near the end of its power stroke, said cylinder having a passage for admitting scavenging air into the head end of said cylinder, a scavenging air inlet valve in said passage automatically operable in accordance with the pressure differences on both sides thereof, whereby said scavenging air inlet valve is automatically opened when said ports are uncovered, and are automatically closed by the pressure created by the compression of the trapped scavenging air in said cylinder during the exhaust stroke of said piston, an exhaust valve at the head end of said cylinder, means for mechanically operating said exhaust valve to cause said latter valve to be opened during the exhaust stroke of said piston, and for closing said exhaust valve during the exhaust stroke of said piston, whereby a portion of the scavenging air is trapped and compressed in said cylinder, and means for varying the time of closure of said exhaust valve with respect to the exhaust stroke of said piston, to vary the compression ratio of said cylinder.

21. A power generating system comprising an internal combustion motor of the type in which no compression of the fuel or air takes place, a separate air compressor driven independently of said motor, means for delivering compressed air from said compressor to said motor, means for simultaneously injecting fuel into said motor, means for varying the quantity of air injected into said motor per combustion stroke, and means for correspondingly varying the amount of fuel injected into said motor, to maintain the air-fuel ratio in said motor approximately constant under varying loads.

22. A method of generating power in an internal combustion engine, which comprises creating a body of compressed air and trapping it in said engine during the stroke just preceding the power stroke, injecting fuel into said body of compressed air near the beginning of the power stroke, admitting into said engine during each power stroke when operating at comparatively slow speed, fully compressed air in amounts not only sufficient to support combustion of said fuel but also in excess to supply substantial power to said engine by its own pressure during said power stroke and as the speed of said engine increases, increasing the amount of compressed air trapped in said engine during said preceding stroke and at the same time reducing the amount of compressed air admitted during each power stroke, to permit the power gases during said power stroke to operate more expansively.

23. A method of generating power in an internal combustion engine, which comprises compressing air in said engine during the stroke just preceding the power stroke, injecting fuel into said compressed air near the beginning of the power stroke, admitting when operating at comparatively slow speed fully compressed air into said engine during a substantial portion of each power stroke, and in excess amounts to support combustion of said fuel and also to supply substantial power to said engine by its own pressure, and as the speed of said engine increases, increasing the amount of air compressed in said engine during said preceding stroke to increase the pressure of said latter air at the beginning of said power stroke, and at the same time reducing the portion of said power stroke during which said compressed air is admitted while increasing the pressure of said admitted compressed air, to permit the power gases during said power stroke to operate more expansively.

24. A method of generating power in an internal combustion engine as described in claim 23, in which said fuel injection is initiated prior to the beginning of said power stroke, and is effected in response to the pressure of the air compressed in said engine when said air is compressed to a predetermined value.

25. A method of generating power in an internal combustion engine as described in claim 23, in which said fully compressed air is supplied by a variable capacity compressor operable to increase the pressure of the air supplied as its capacity is reduced.

26. In combination, an internal combustion engine, means separate from said engine for fully compressing air and admitting it into said engine during each power stroke in sufficient excess amounts not only to support combustion during said power stroke but to increase substantially the power of said engine by the pressure action of said compressed air, and means automatically operable as the speed of said engine is increased for reducing the portion of said power stroke during which said fully compressed air is admitted into said engine.

27. The combination as described in claim 26, in which said automatically operable means is effective to increase the pressure of said air as the portion of said power stroke during which said compressed air is admitted into said engine is decreased.

28. In combination, an internal combustion engine, a variable capacity compressor, and means for delivering fully compressed air from said compressor to said engine during the power stroke of said engine to increase substantially the power of said engine.

29. The combination as described in claim 28, in which said compressor is driven by said engine.

30. In combination, an internal combustion engine having a working cylinder with a mechanically operable compressed air admission valve, and means for supercharging said engine comprising a variable capacity compressor driven by said engine and having its outlet connected to said valve, and means for timing said valve to admit fully compressed air from said compressor to said cylinder during the power stroke to increase substantially the power of said engine.

31. The combination as described in claim 30, comprising means for varying the timing of said valve to vary the cut-off of said compressed air during the power stroke.

32. In combination, an internal combustion engine having means for trapping a body of air in said engine and compressing it during the stroke just preceding the power stroke, and means for injecting fuel into said body of air near the beginning of the power stroke, means separate from said engine for fully compressing air and admitting it into said engine during each power stroke in sufficient excess amounts not only to support combustion during said power stroke but also to increase substantially the power of said engine by the pressure action of said compressed air, and automatic means operable as the speed of said engine is increased for increasing the amount of air trapped in said engine during said preceding stroke to increase its pressure at the beginning of the power stroke and at the same time reducing the amount of compressed air admitted during each power stroke while increasing its pressure, to permit the power gases during said power stroke to operate more expansively.

33. In combination, an internal combustion engine, a variable capacity compressor of the variable effective displacement type, and means for delivering fully compressed air from said compressor to said engine during the power stroke of said engine to increase substantially the power of said engine.

HARVEY W. BELL.

REFERENCES CITED

The following references are of record in the file of this patent:

UNITED STATES PATENTS

| Number | Name | Date |
|---|---|---|
| 824,743 | Richter | July 3, 1906 |
| 1,079,578 | Peterson | Nov. 25, 1913 |
| 1,176,252 | Schenker | Mar. 21, 1916 |
| 1,188,607 | Barlow | June 27, 1916 |
| 1,821,662 | Muller | Sept. 1, 1931 |
| 2,115,525 | Hocke | Apr. 26, 1938 |
| 2,148,854 | Bokemuller | Feb. 28, 1939 |
| 2,383,565 | Rose | Aug. 28, 1945 |

FOREIGN PATENTS

| Number | Country | Date |
|---|---|---|
| 375,116 | Great Britain | 1932 |